Figure 1:
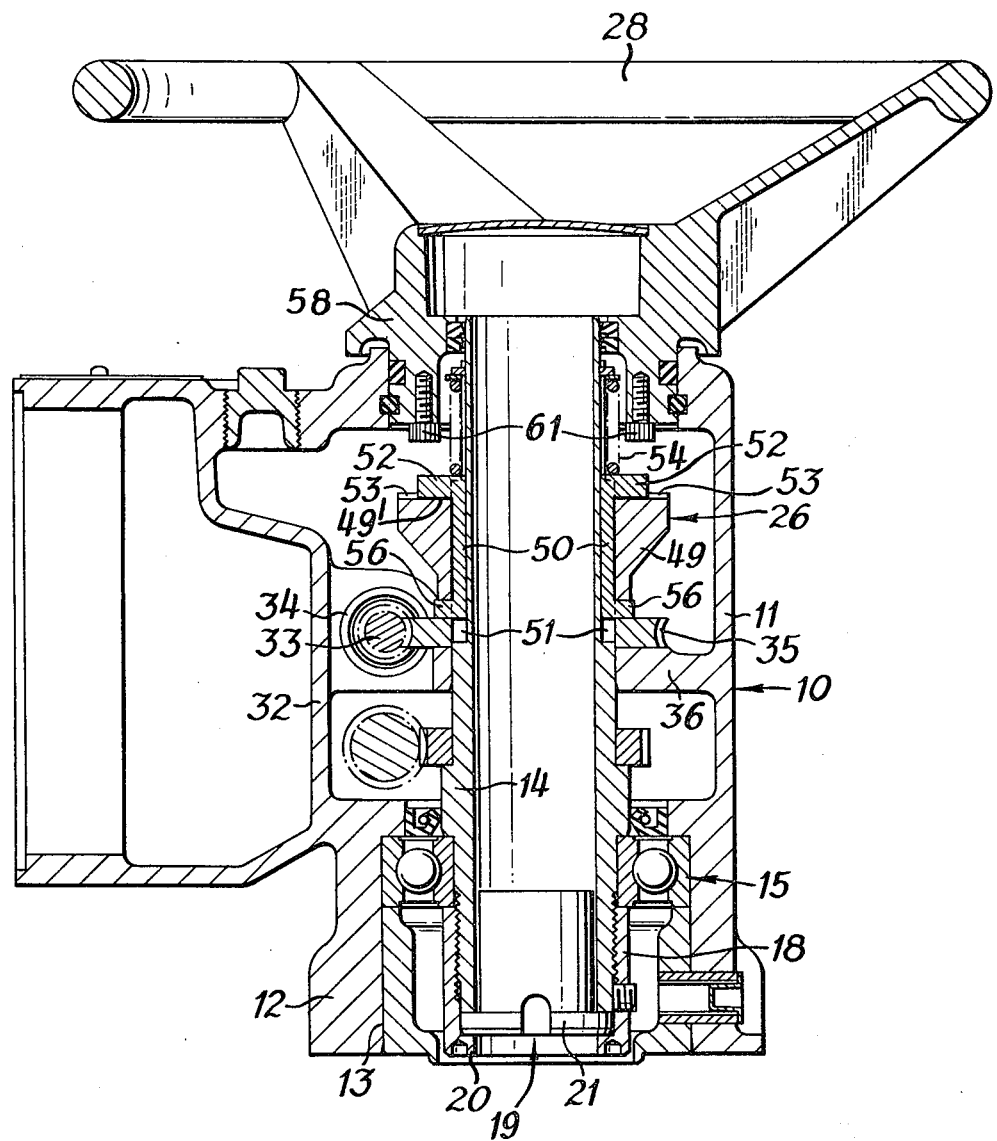

United States Patent [19]
Hore

[11] 3,994,178
[45] Nov. 30, 1976

[54] ACTUATORS

[75] Inventor: Donald Lionel Hore, Mangotsfield, England

[73] Assignee: Rotork Limited, Bath, England

[22] Filed: July 29, 1974

[21] Appl. No.: 492,718

[30] Foreign Application Priority Data
Aug. 10, 1973 United Kingdom............... 38072/73

[52] U.S. Cl.............................. 74/89.15; 188/134; 192/8 R
[51] Int. Cl.²....................................... F16H 27/02
[58] Field of Search....................... 74/424.8, 89.15; 188/134; 192/8 R

[56] References Cited
UNITED STATES PATENTS

| | | | |
|---|---|---|---|
| 2,105,867 | 1/1938 | Stewart............................... | 188/71.7 |
| 2,258,307 | 10/1941 | Vickers................................ | 192/8 R |
| 2,783,861 | 3/1957 | Jungles................................ | 192/8 R |
| 3,024,873 | 3/1962 | Wilkinson........................... | 188/71.7 |
| 3,572,482 | 3/1971 | Kalpas................................. | 192/8 R |
| 3,680,672 | 2/1972 | McCurley .......................... | 192/8 R |

*Primary Examiner*—Samuel Scott
*Assistant Examiner*—Wesley S. Ratliff, Jr.
*Attorney, Agent, or Firm*—Stevens, Davis, Miller & Mosher

[57] ABSTRACT

The invention relates to a motor driven actuating mechanism which incorporates means of sensing torque and deriving a mechanical movement therefrom. The invention provides a mechanical brake which utilizes the mechanical movement of the torque sensing means to brake the mechanism if a preset torque is exceeded.

In the preferred embodiment of the invention the mechanism comprises a worm and wormwheel in which the worm shaft is movable axially against a spring in response to torque reaction. The shaft movement is utilized to de-energize the drive motor and the mechanical brake comprises a brake disc attached to the worm shaft.

3 Claims, 4 Drawing Figures

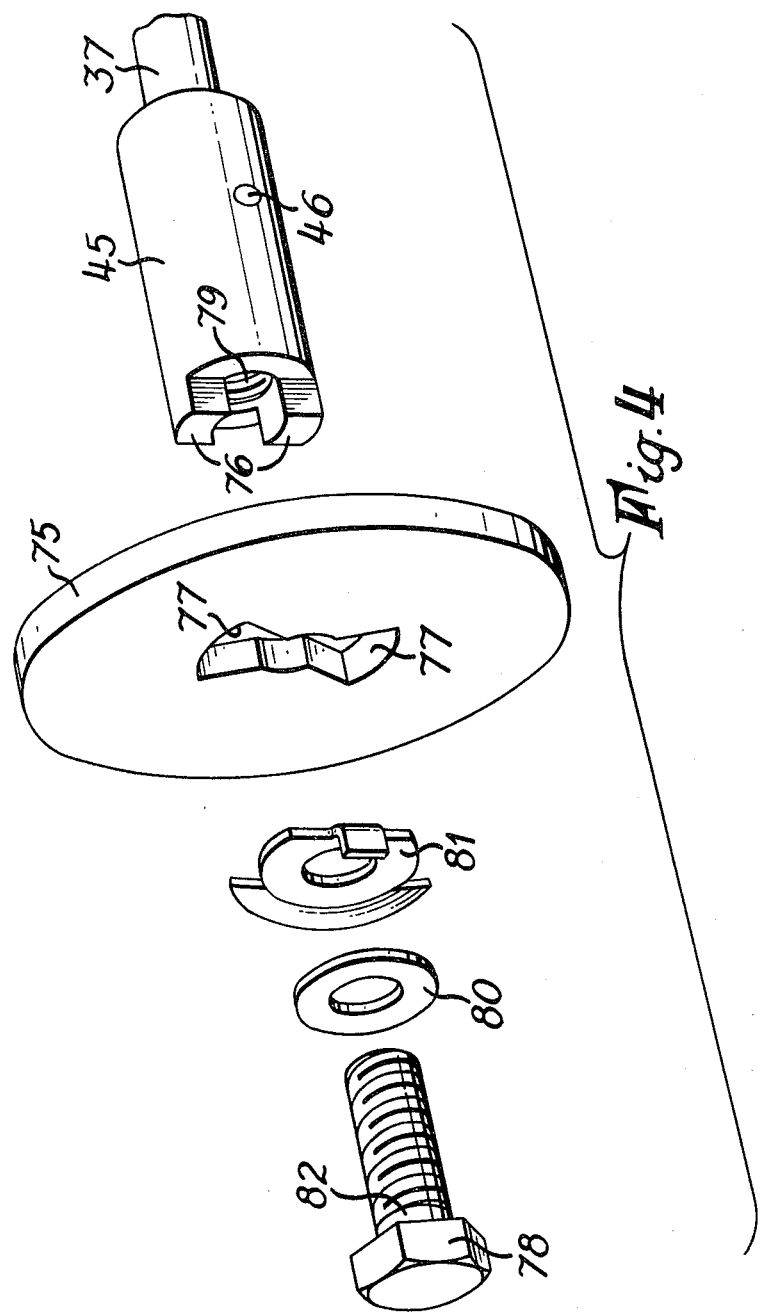

ACTUATORS

This invention relates to a motor operated mechanism, such as a valve, provided with a torque limiting brake.

The seating force applied to a motor operated valve is normally controlled by what is known as torque limit, in which torque reaction in the actuating mechanism is utilised to disconnect the power to the driving motor once a preset value of torque is reached.

A typical actuating mechanism may incorporate a worm and wheel, with the shaft of the worm able to move in an axial direction against springs, the deflection of said shaft being a measure of the applied torque. The resulting deflection or movement may be utilised to trip out an electric motor by means of a torque limit switch and contactor, or disconnect a fluid-powered motor through a suitable valve system. There will inevitably be some small delay between the sensing of the torque and the disconnection of the motor, depending on the reaction times of the switches or valves concerned, which causes the torque applied to the valve to be higher than that at which the torque limit was set. How much higher will obviously depend on the times involved, and also on the rate at which the torque is increasing as the valve seats. This in turn will be a function of the operating speed of the motorised valve and its rigidity, and the difference becomes very significant at high operating speeds on high pressure valves.

The torque limitation is also rendered ineffective if the components are not correctly interconnected, and with electric motors if the phase rotation is incorrect. In such cases, the motor will stall against the shut valve with the possibility of damage, particularly at high speeds when the kinetic energy of the moving parts has to be dissipated suddenly.

The object of the present invention is to provide protection to the valve by preventing the motor from delivering excessive torque by the application of a brake. The torque reaction force of the actuating mechanism is utilised to apply the brake directly as soon as a torque higher than the required value is sensed. This eliminates any delay in the application of the brake such as occurs if an electric motor is fitted with an electro-magnetic brake, in which case the delays in disconnection already referred to also delay the application of the brake and therefore make it useless for the purpose.

In its broadest aspect the invention provides a motor driven actuating mechanism incorporating a means of sensing torque and deriving a mechanical movement therefrom, said mechanical movement being utilised to apply a mechanical brake if a pre-set torque is exceeded. In a preferred use of the invention the actuating mechanism utilises a worm and wheel drive, e.g. to a valve, and a brake disc is attached to the shaft of the worm so as to be brought into contact with a brake pad when the shaft deflection exceeds a preset valve in either direction, excess motor torque is therefore absorbed directly by the brake, and not imparted to the value through the actuating mechanism in the event of a delayed disconnection of the power source.

Lost motion backlash may be introduced between the shaft of the worm and the brake disc so that, when the brake has been applied, reverse motion of the motor is not subject to brake friction, and the motor can deliver its full starting torque in the unseating direction.

Figure 2:
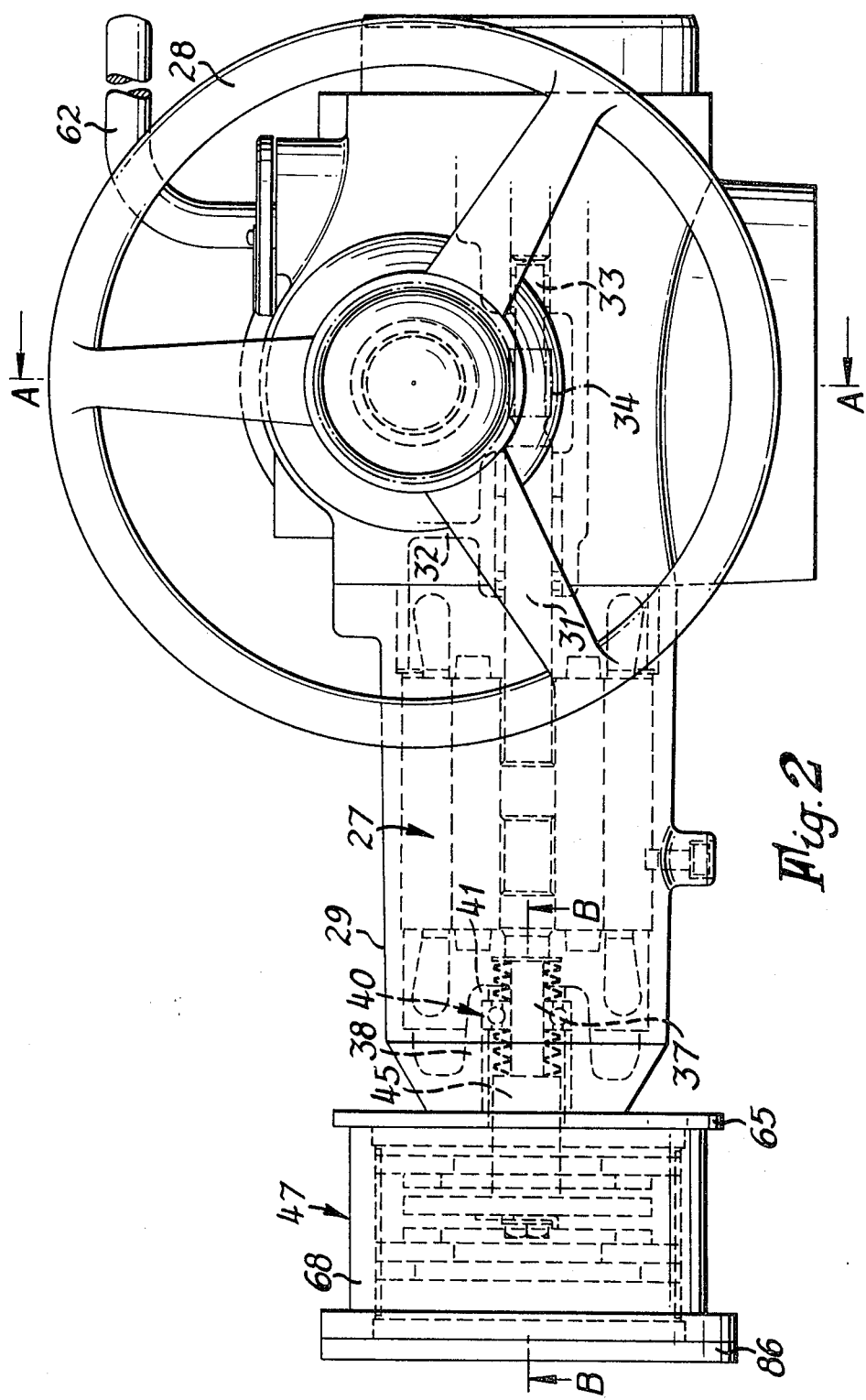
Figure 3:
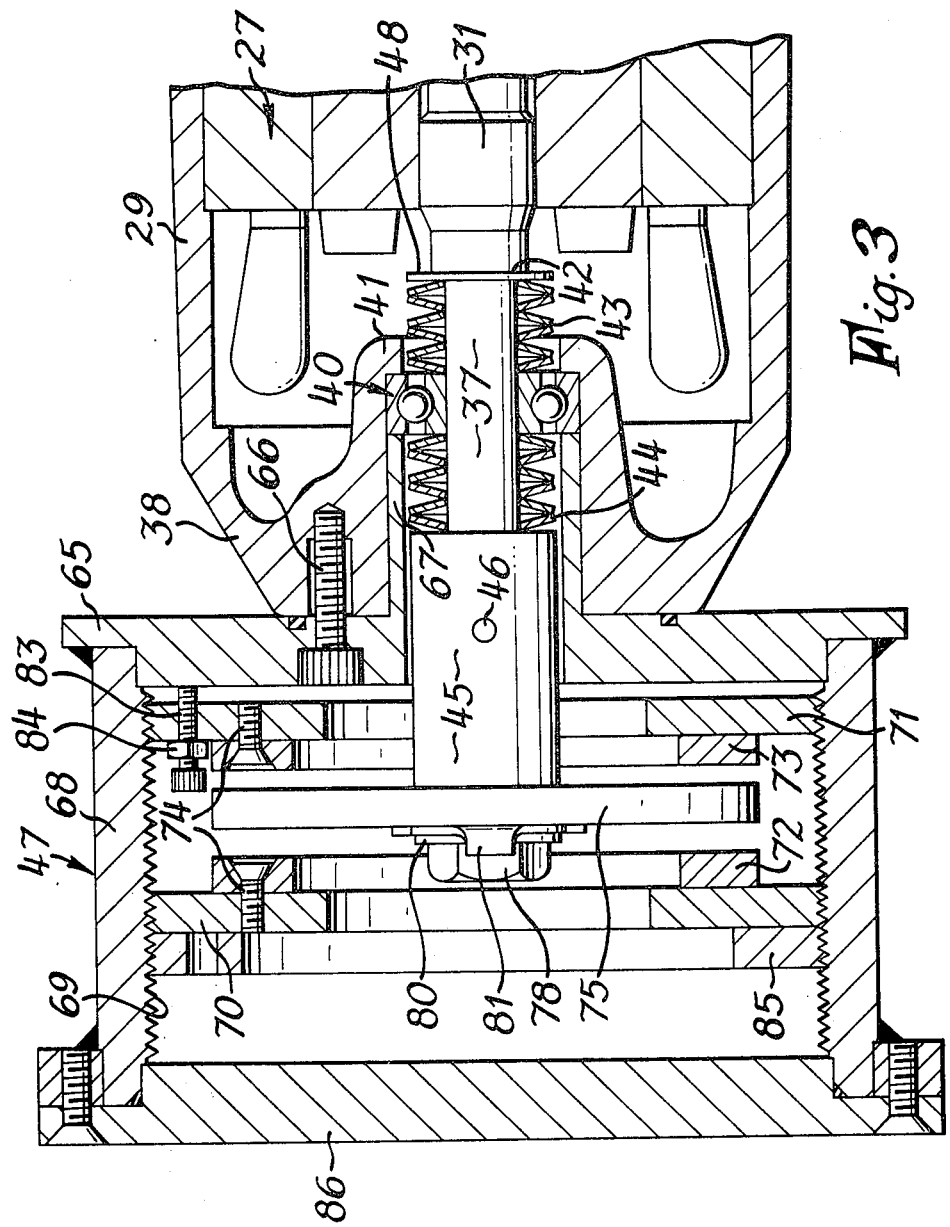

The invention will now be described by way of example as forming part of a valve actuator. The valve actuator is illustrated in the accompanying drawings, in which:

FIG. 1 is a sectional elevation of the valve actuator taken on the line A—A of FIG. 2, FIG. 2 is a plan view of the actuator of FIG. 1, FIG. 3 is a sectional view taken on the line B—B of FIG. 2 of the brake mechanism on an enlarged scale, and FIG. 4 is an exploded perspective view of the drive coupling for the brake disc.

Referring now to FIGS. 1 and 2 the valve actuator illustrated is of the kind described in our copending application Ser. No. 339,712, now U.S. Pat. No. 3,863,745. Briefly, however, the actuator 10 comprises a main casing 11 the lower part 12 of which is provided with an outlet 13 therein for the lower end of the main hollow output shaft 14 of the actuator which extends vertically in the casing 11. The lower end of the shaft 14 outside the casing 11 is provided with a combined radial and thrust bearing 15 which is capable of receiving thrust in response to movement of the output shaft 14 in either direction. A sleeve 18 is threadably attached over the outer surface of the output shaft 14 and is formed with an internally extending end flange 20 which holds a nut member 21 in position inside the end of the hollow output shaft. The nut member is internally threaded or splined for engaging the valve spindle (not shown).

The hollow output shaft 14 is provided along its length within the casing 11 with a clutch member 26 which is slidably mounted on the shaft 14 for axial movement relatively thereto but which is keyed to the shaft so as to rotate therewith. The clutch member 26 is movable between two positions in one of which it connects the output shaft 14 with an electric motor 27 (FIG. 2) for power operation, and in the other of which it connects the output shaft 14 for manual operation by a handwheel 28 externally mounted on top of the casing 11. The electric motor 27 for power operation is mounted in a horizontally located casing 29 extending from the main casing 11. The motor 27 is reversible and the driving shaft 31 extends through a wall 32 into the main casing 11, the other end 33 of the shaft 31 being provided with a worm 34 which is in driving engagement with a wormwheel 35 freely mounted around the hollow output shaft 14 and supported on a horizontal wall or plate 36.

The opposite end 37 of the motor shaft 31 extends from the motor 27 into a small auxiliary housing 38 in which a bearing 40 is positioned against the partition wall 41. The bearing 40 supports the extension 37 of the motor shaft 31 which is of reduced diameter thus forming a shoulder 42. A disc spring pack 43 or helical spring is positioned between the shoulder 42 through the intermediary of a washer 48 and the adjacent side of the bearing 40 and a second disc spring pack 44 or helical spring is positioned between the other side of the bearing 40 and a coupling member 45 held on the shaft 37 by a pin 46. The coupling member 45 forms part of a torque limiting brake assembly 47 to be described hereinafter.

The two springs 43,44 act to centralise the motor shaft 31 while permitting axial movement of the shaft 31 in one or other axial direction depending on the direction of motor operation in response to a predetermined torque due to resistance to movement of the valve. This axial movement of the motor shaft 31 is normally used to operate torque switches in a control unit (not shown), for example, for de-energising the motor circuit.

The clutch member 26 comprises a ring or sleeve 49 which is mounted within a pair of driving members or keys 50 of U shape (see Fig. 1). The driving members or keys 50 are positioned diametrically of the clutch ring 49 and the base portion of each U-shaped driving member or key 50 is vertically positioned and slidably engaged within a vertical or axial keyway 51 (see FIGS. 2 and 3) in the surface of the output shaft 14. The upper horizontally extending arms 52 of the driving members or keys are each located in radial slots 53 in the upper surface 49' of the clutch ring 49 so as to prevent relative rotational movement (see FIGS. 1 and 2).

The clutch ring 49 is therefore slidably mounted for axial movement on the output shaft 14 by means of the driving members or keys 50 which are normally urged downwardly by a coiled compression spring 54 into engagement with the upper surface of the wormwheel 35. The wormwheel 35 is provided on its upper surface with driving dogs or projections (not shown) so as to impart the rotary movement of the wormwheel 35 to the output shaft 14 by engagement with the lower horizontally extending arms 56 of the driving members or keys 50 when the motor 27 is energised.

The lower edge surface of the handwheel boss 58 is provided with two diametrically positioned drive screws 61 on its lower edge surface and which are intended to engage drivably with the upper arms 52 of driving members or keys 50 of the clutch member 26 when the clutch member is slidably moved upwardly against its spring. When the clutch member 26 is held in its uppermost position rotation of the handwheel 28 will transmit rotation through the driving members or keys 50 and clutch ring 49 to the output shaft 14. The movement of the clutch member 26 to its uppermost or manual position is obtained manually by the operator by means of the cranked hand lever 62. The lever 62 incorporates a lifting jack which engages the sloping surface of the clutch member 26. The clutch member is retained in its manual position by a pawl as described in the copending application Ser. No. 339,712.

Referring now to FIGS. 3 and 4 of the drawings, the torque limiting brake assembly comprises a mounting plate 65 attached to the auxiliary housing 38 by screws 66. The plate 65 is formed with an annular extension 67 which projects into the housing to engage and thereby position bearing 40.

A cylindrical body member or housing 68 is attached to plate 65. The housing 68 is internally threaded at 69 for threadably supporting a pair of rings 70,71 the outer circumferences of which are threaded to match the internal threading 69 of housing 68.

The rings 70,71 support annular brake pads 72, 73 respectively attached to the rings by screws 74.

A brake disc 75 is positioned between the brake pads 72, 73 and is attached to the end of shaft 37 by means of the coupling member 45. The assembly is shown in FIG. 4 of the drawings and it will be seen that the coupling member 45 is formed at its end with a pair of projecting drive dogs 76 which engage each within a 45° cut-away slot 77 in the brake disc 75, the circumferential width of the dogs being less than that of the slots so as to permit a limited rotational movement of the shaft 37 relative to the brake disc 75.

The brake disc 75 is retained in position on the dogs 76 of the coupling member by means of a bolt 78 which threadably engages a threaded bore 79 in coupling member 45. The head of the bolt 78 engages the adjacent face of disc 75 through the intermediary of a plain washer 80 and a tab washer 81 so as to permit the relative movement between disc 75 and member 45 as mentioned above. However, the tab washer 81 may be omitted so long as the dogs 76 are longer than the thickness of the disc 75 and the washer 80 is tightened hard against the dogs by the bolt 78 to give the washer sufficient axial clearance for rotation relative to member 45. The disc 75 is journalled on a plain portion 82 of bolt 78.

In operation, as the worm shaft 31 moves axially in one or other direction due to torque reaction, the brake disc 75 is brought into contact with one of the brake pads 70,71 to stop further rotation of the shaft. The amount of axial movement required to engage the brake disc 75 with one of the brake pads is determined by adjustment of the rings 70 and 71 in the threaded housing 68. The setting of the pad 73 is locked by three set screws 83 with lock nuts 84, while the setting of pad 72 is locked by ring 85 which is also threadably mounted in housing 68. The brake assembly is then sealed off by means of a cover plate 86.

If the brake disc 75 were solidly attached to coupling member 45, the motor 27 when starting up again would have to overcome the initial friction of the disc 75 and pad. The coupling assembly shown in FIG. 4 provides a rotary backlash between the disc 75 and coupling member 45, which allows the worm shaft 31 to rotate part of a turn before the disc 75 rotates. This movement allows the shaft 31 to move back axially from the position at which the disc 75 and pad were engaged before the disc 75 has to rotate, thus removing the friction load.

Although the invention has been described in its application to a valve actuator with an electric motor drive, it will be understood that it could be utilised with another rotary motor in which axial movement of a worm shaft is used to measure torque. Similarly, any other transmission gear incorporating a mechanical torque sensing mechanism in which torque reaction against a resilient member causes movement, could be arranged to apply mechanical brake to the motor drive. Some examples of such a mechanism might be:

a. a helical spur gear drive, in which one of the gears is allowed to move axially against springs b. an epicyclic or planetary gear system in which torque reaction of the planet cage against springs is used to apply a brake.

The invention is of particular use in high speed valve actuators for nuclear reactors, which require an excessively high margin of motor torque available to guarantee operation under reduced voltage conditions.

I claim:

1. A motor driven actuating mechanism having a casing and a motor housing attached to the casing, an output shaft in the casing, a worm, a worm shaft and a motor mounted on the worm shaft a spring in the housing, a worm wheel in which the worm shaft is movable in an axial direction against the spring in response to the torque reaction, said movement being utilized to de-energize the drive motor, said worm wheel being drivably connected to the output shaft, a brake assembly attached to the motor housing and comprising a body member supporting two adjustable brake pads, and a brake disc attached to the worm shaft which is adapted to be brought into engagement with the brake pads when the shaft deflection exceeds a predetermined value in either direction.

2. An actuating mechanism as claimed in claim 1, wherein the brake disc carried by the worm shaft is located between the adjustable brake pads, the body member is internally threaded, and the brake pads are carried by adjustable rings threadably mounted in said body member.

3. An actuating mechanism as claimed in claim 2, wherein the adjustable rings are provided with locking devices.

* * * * *